United States Patent
Katti et al.

(10) Patent No.: US 11,258,898 B1
(45) Date of Patent: Feb. 22, 2022

(54) ENHANCED PERSONALIZED PHONE NUMBER RECOMMENDER

(71) Applicant: FORD GLOBAL TECHNOLOGIES, LLC, Dearborn, MI (US)

(72) Inventors: Bhagyashri Satyabodha Katti, Novi, MI (US); Fling Tseng, Ann Arbor, MI (US); Erick Michael Lavoie, Van Buren Charter Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/153,389

(22) Filed: Jan. 20, 2021

(51) Int. Cl.
*H04M 3/42* (2006.01)
*H04M 1/57* (2006.01)

(52) U.S. Cl.
CPC ......... *H04M 3/42102* (2013.01); *H04M 1/57* (2013.01); *H04M 2203/551* (2013.01); *H04M 2203/556* (2013.01)

(58) Field of Classification Search
CPC ............... H04M 3/42102; H04M 1/57; H04M 2203/551; H04M 2203/556; H04M 3/5233; H04M 3/5232; H04M 3/5191; H04M 3/5175; H04M 3/5183; H04M 3/5235; H04M 2250/60; H04M 3/42059; H04M 3/4365; H04M 3/5166; H04M 1/72454; H04M 2203/558; H04M 2203/559; H04M 3/5158; H04M 1/2746; H04M 2203/555; H04M 3/5238; H04M 19/04; H04M 1/66; H04M 1/72403; H04M 1/72469; H04M 2201/14; H04M 2201/18; H04M 2201/36; H04M 2201/38; H04M 2201/40;
(Continued)

(56) References Cited

U.S. PATENT DOCUMENTS

| 5,436,965 A * | 7/1995 | Grossman ............... H04M 3/36 |
| | | 379/112.01 |
| 10,542,157 B1 | 1/2020 | Ostberg |

(Continued)

FOREIGN PATENT DOCUMENTS

| WO | 2019016250 A1 | 1/2019 |
| WO | 2019086782 A1 | 5/2019 |

*Primary Examiner* — Akelaw Teshale
(74) *Attorney, Agent, or Firm* — Michael J. Spenner; Brooks Kushman P.C.

(57) ABSTRACT

Parameters of clusters of a context-encoded model are updated, per frequency estimation of an aspect of calls to contacts with respect to unique combinations of contextual data of calls matching the respective clusters. The clusters are weighted according to relevance of the unique combinations of contextual data to current contextual information. First probabilities of calling individual contacts are determined according to the current contextual information and one or more inferences between calls determined from the clusters as weighted. Second probabilities of calling each of the plurality of contacts are determined according to a set of rules defining prioritizations for contacts based on external factors. Third probabilities of calling each of the plurality of contacts are determined according to calling patterns of other of the plurality of contacts. The first, second, and third sets of weights are combined to determine final predictions for predicted probabilities to call each of the contacts.

23 Claims, 10 Drawing Sheets

(58) Field of Classification Search
CPC ......... H04M 2201/41; H04M 2201/60; H04M 2203/158; H04M 2203/2072; H04M 2203/2077; H04M 2203/256; H04M 2203/357; H04M 2203/401; H04M 2203/404; H04M 2203/408; H04M 2250/10; H04M 2250/12; H04M 2250/22; H04M 3/323; H04M 3/362; H04M 3/42042; H04M 3/42068; H04M 3/4211; H04M 3/42221; H04M 3/42365; H04M 3/4285; H04M 3/436; H04M 3/4878; H04M 3/493; H04M 3/51; H04M 3/5141; H04M 3/523; H04M 3/5237; H04M 3/527; H04M 3/54; H04M 3/58
See application file for complete search history.

(56) References Cited

U.S. PATENT DOCUMENTS

| | | | | |
|---|---|---|---|---|
| 2004/0230435 | A1* | 11/2004 | Douros | H04M 1/271 704/275 |
| 2009/0041224 | A1* | 2/2009 | Bychkov | H04W 4/16 379/216.01 |
| 2012/0183131 | A1* | 7/2012 | Kohler | H04M 3/5238 379/265.12 |
| 2014/0254776 | A1* | 9/2014 | O'Connor | H04M 3/493 379/88.01 |
| 2017/0316438 | A1* | 11/2017 | Konig | G06Q 30/0204 |
| 2018/0227420 | A1* | 8/2018 | Burg | H04L 41/507 |
| 2019/0108567 | A1 | 4/2019 | Aziz et al. | |
| 2020/0394558 | A1* | 12/2020 | Katti | G06N 20/00 |

\* cited by examiner

ENHANCED PERSONALIZED PHONE NUMBER RECOMMENDER

TECHNICAL FIELD

The present disclosure relates to aspects of prediction of the next contact to be called by a user of a communications system.

BACKGROUND

Calling systems typically provide address book functionality that provides a list of contacts that may be called. Calling systems also tend to include a favorites list of contacts that are frequently accessed, as well as a listing of missed calls or recent calls.

SUMMARY

In one or more illustrative examples, a call prediction device is provided. A memory is configured to store call records of phone calls to a plurality of contacts. A processor programmed to determine a first set of weights indicative of first probabilities of calling each of the plurality of contacts, according to current contextual information for a caller and call inferences determined from clusters of a context-encoded model created from the call records, each cluster corresponding to a unique combination of ranges of values of the contextual information; determine a second set of weights indicative of second probabilities of calling each of the plurality of contacts according to a set of rules defining prioritizations for contacts based on external factors; determine a third set of weights indicative of third probabilities of calling each of the plurality of contacts according to calling patterns of other of the plurality of contacts; combine the first, second, and third sets of weights to determine final predictions for predicted probabilities to call each of the contacts; and identify the most likely next contact to call as the one of the plurality of contacts having a highest of the predicted probabilities.

In one or more illustrative examples, a method for call prediction is provided. Parameters of clusters of a context-encoded model are updated, per a frequency estimation of an aspect of calls to contacts with respect to unique combinations of contextual data of calls matching the respective clusters. The clusters are weighted according to relevance of the unique combinations of contextual data to current contextual information. First probabilities of calling individual contacts are determined according to the current contextual information and one or more inferences between calls determined from the clusters as weighted. Second probabilities of calling each of the plurality of contacts are determined according to a set of rules defining prioritizations for contacts based on external factors. Third probabilities of calling each of the plurality of contacts are determined according to calling patterns of other of the plurality of contacts. The first, second, and third sets of weights are combined to determine final predictions for predicted probabilities to call each of the contacts In one or more illustrative examples, a non-transitory computer-readable medium includes instructions that, when executed by a computing device, cause the computing device to update parameters of clusters of a context-encoded model, per a frequency estimation of an aspect of calls to contacts with respect to unique combinations of contextual data of calls matching the respective clusters; weight the clusters according to relevance of the unique combinations of contextual data to current contextual information; determine first probabilities of calling individual contacts according to the current contextual information and one or more inferences between calls determined from the clusters as weighted; determine second probabilities of calling each of the plurality of contacts according to a set of rules defining prioritizations for contacts based on external factors; determine third probabilities of calling each of the plurality of contacts according to calling patterns of other of the plurality of contacts; and combine the first, second, and third sets of weights to determine final predictions for predicted probabilities to call each of the contacts.

DETAILED DESCRIPTION

Figure 1:
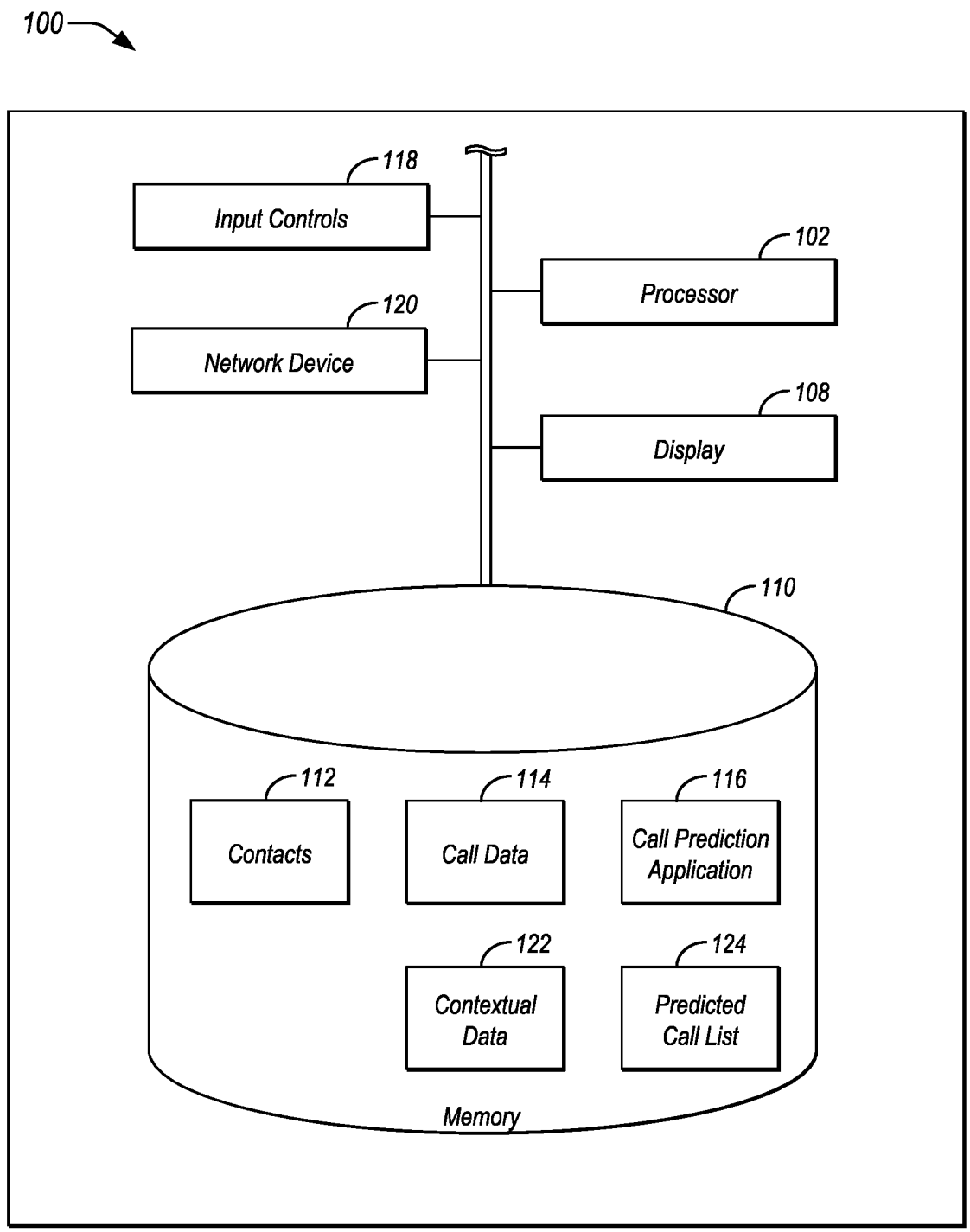
FIG. 1 is a schematic diagram of an exemplary embodiment of a system for performing intelligent call ranking

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Current calling systems are unable to predict what contact or contacts a user may likely call next. However, it may be desirable for a calling system to provide such a prediction. For example, in the vehicle environment it may be undesirable for a user to scroll through lists of names while the user is performing driving tasks.

An intelligent call ranker and/or dialer device may be created that learns the user's calling behavior and that predicts and ranks the next contacts to call based on the current context. The device may intelligently rank contacts of a user according to smart frequency estimations including time between contacts of the same person, relative frequencies among likely contacts, time since last contacting a person, etc. The device may further utilize additional contextual information such as day, time, and location, such that the device can use the context as predictors of which contacts are more likely to be called. The device may further be configured to handle uncertainty in the resulting list, as well as provide predictions in situations of uncertainty. The device may further utilize an incremental learning approach and may begin learning from scratch.

A recursive estimation may be implemented either onboard or offboard the device. Using the estimation, contacts may be ranked higher if their average contact frequency is high. With the same contact frequencies, contacts that were contacted less recently may be ranked high. Other contexts may be incorporated if needed with additional parameters. Inferences with respect to calls to the contacts may be based on recursive estimates that reflect on most recent behavior, such that purging of old call data is automatic. Additional contextual factors regarding the historical calls (e.g., day, time, location, etc.) may also be incorporated into the predictive model using information-encoding techniques.

Yet further, additional factors may be considered to account for parameters beyond calling pattern and current context (e.g., day, time, location, etc.). For instance, the system may further be influenced by vehicle type, health, disabling status; other users' calling patterns and contexts, receipt of text messages and/or voice messages from contacts, shared calendar information, and/or occupant/phone detection inside vehicle.

The predictive models may be constructed with one or multiple inferences, with or without the encoded information. Such approaches may be suitable for in-car use as well as for a portable contact predictor activated from a connected computing device.

FIG. 1 is a schematic diagram of an exemplary embodiment of a system 100 for performing intelligent call ranking. The system 100 includes a processor 102 that is operatively connected to a memory 110, input controls 118, a network device 120, and a display device 108. In the system 100, the processor 102 may include one or more integrated circuits that implement the functionality of a central processing unit (CPU) and/or graphics processing unit (GPU). In some examples, the processor 102 is a system on a chip (SoC) that integrates the functionality of the CPU and GPU, and optionally other components including, for example, the memory 110, a network device, and a positioning system, into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families. Additionally, alternative embodiments of the processor 102 can include microcontrollers, application specific integrated circuits (ASICs), field programmable gate arrays (FPGAs), digital signal processors (DSPs), or any other suitable digital logic devices. Regardless of the specifics, during operation, the processor 102 executes stored program instructions that are retrieved from the memory 110. The stored program instructions include software that controls the operation of the processor 102 to perform the operations described herein.

The GPU may include hardware and software for display of at least two-dimensional (2D) and optionally three-dimensional (3D) graphics to a display device 108. The display device 108 may include an electronic display screen, projector, printer, or any other suitable device that reproduces a graphical display. In some examples, processor 102 executes software programs including drivers and other software instructions using the hardware functionality in the GPU to accelerate the performance of machine learning or other computing operations described herein.

The display device 108 may include an electronic display screen, projector, printer, or any other suitable device that reproduces a graphical display that is generated via the processor 102. In an example, the display device 108 may be a head unit display of a vehicle. In another example, the display device 108 may be a screen of a smartphone, tablet, watch, or other portable computing device.

The memory 110 may include both non-volatile memory and volatile memory devices. The non-volatile memory includes solid-state memories, such as NAND flash memory, magnetic and optical storage media, or any other suitable data storage device that retains data when the system 100 is deactivated or loses electrical power. The volatile memory includes static and dynamic random-access memory (RAM) that stores program instructions and data during operation of the system 100. As shown, the memory 110 may store the contacts 112, call data 114, contextual data 122, and call prediction application 116 for maintenance and retrieval.

The input controls 118 may include any of various devices that enable the system 100 to receive control input. Examples of suitable input devices include human interface inputs such as keyboards, mice, touchscreens, voice input devices, and the like.

A network device 120 may include any of various devices that enable the system 100 to receive the call data 114, contextual data 122 or other data from an external device. Examples of suitable network devices 120 include a network adapter or peripheral interconnection device that receives data from another computer or external data storage device, which can be useful for receiving large sets of call data 114 in an efficient manner.

The contacts 112 refer to data records that each define information about a contact that may be called using the network device 120. In an example, the contacts 112 may indicate a name of a contact, and one or more identifiers that may be used to send or receive communications with the contact. These identifiers may include, as some non-limiting examples, phone numbers, instant message account names, online user handles, email addresses, and so on.

The call data 114 refers to a plurality of records that are each representative of a call or other communication session between the user and a contact 112. Each call data 114 record may include an indication of which contact 112 was communicated with, whether the user or the contact 112 initiated the communication, whether the contact 112 was available (e.g., picked up the call), a day and time at which the communication session was initiated, and a duration of the communication session. In some instances, some or all of the call data 114 may be received from a data storage device.

The contextual data 122 may include additional information about circumstances surrounding the calls in the call data 114. In an example, the contextual data 122 may indicate the location of the user during the call. In another example, the contextual data 122 may include the speed of travel of the user, and/or the direction of travel of the user during the call. In yet another example, the contextual data 122 may indicate the distance covered during the call (e.g., as a difference between the location of the user at the beginning of the call and the location of the user at the end of the call). In another example, the day may be divided into a plurality of time segments (e.g., hours, half-hours, etc.), and the contextual data 122 may indicate during which time segment the call was made. The contextual data 122 may also include hardware identifiers related to the network device 120 itself, such as a MAC address of the network device 120, SIM data, a firmware version of the network device 120, aspects of the network to which the network device 120 was connected (e.g., whether the connection was over 3G, 4G LTE, 5G, etc., whether the network device 120 was roaming, etc.) and so on.

As some other examples, in cases where the user is in a vehicle, the contextual data 122 may include data about the vehicle, such as a key-on day and time for the vehicle, key fob information (e.g., which may be indicative of an identity of a driver), whether the network device 120 was paired with the vehicle, various vehicle signals, (e.g., what gear the vehicle was in, vehicle speed, seatbelt status, etc.). The contextual data 122 may include other information about the trip of the user having the call as well, such as what type of road the user traveled (e.g., dirt road, expressway, speed limit of the road, number of lanes of the road, etc.).

The predicted call list 124 may include a listing of one or more contacts 112 that are deemed to be the most likely call to be made as the next call by the user. In an example, each predicated call on the predicted call list may be determined to have a likelihood of being the next call, and the predicted call list 124 may be sorted in decreasing order of likelihood.

While the illustrated system 100 is shown using a single computing device that incorporates the display device 108, other example systems 100 may include multiple computing devices. As one example, the processor 102 generates the predicted call list 124 and transmits the predicted call list 124 to a remote computing device using the network device 120 via a data network. The remote computing device then may display a user interface displaying the predicted call list 124. In another nonlimiting example, the processor 102 is implemented in a server computing device that executes the call prediction application 116 to implement a web server that transmits data to a web browser in a remote client computing device via a data network. The client computing device implements a web browser or other suitable image display software to display the data received from the server using a display device 108 of the client computing device.

The call prediction application 116 includes instructions that, when executed by the processor 102 of the system 100, cause the system 100 to perform the processes and operations described herein. The call prediction application 116 may be programmed to perform a recursive estimation to estimate inferences for calling behaviors. These inferences may include time between calls, calling frequencies, and/or calling durations. For instance, contacts 112 may be ranked higher if their average contact frequency is higher, their call duration is higher, or their time between calls is lower. Additionally, for contacts 112 having the same contact frequencies, contacts 112 that were contacted less recently may be ranked higher. The learning rate may be adjusted to capture long-term vs short-term behaviors. This may allow for the reduction of issues with dealing with the purging of old or otherwise outdated data. The call prediction application 116 may be further programmed to incorporate other aspects from the contextual data 122, if needed, to use additional parameters in the prediction.

With respect to frequency estimation for the time between calls inference, the call prediction application 116 may be programmed to determine the contact frequency by counting occurrences of calls in the call data 114 with respect to each of the contacts 112. In some examples, time information for the calls in the call data 114 may additionally be considered with a forgetting factor, such that calls that are less recent in time are counted less than calls that are more recent in time. Additionally, contextual data 122 for each of the calls may be embedded into the frequency data to provide meaningful information to use in the prediction process.

An example equation for the learning of mean time between calls (MTBC) for a contact 112 is shown in Equation (1) as follows:

$$\beta_i(t+1)=\alpha*\beta_i(t)+(1-\alpha)*TBC_i(t) \qquad (1)$$

where:
　$\alpha$ is a learning rate (e.g., 0.9);
　i is a contact;
　t is a unit of time;
　TBC is a last observed value of time between calls;
　$\beta_i(t)$ is a mean time between calls parameter at time t; and
　$\beta_i(t+1)$ is a mean time between calls parameter at a next time t+1.

A numerical example is shown in Equation (2) as follows:

$$40.5=0.9*40+(1-0.9)*45 \qquad (2)$$

The mean time between calls may be measured in hours, days, minutes, or other units of time as $\beta_i$ for contact i. Notably, $\beta=1/\lambda$, so $\lambda$ relates to the frequency (e.g., the rate of occurrences over a fixed period of time). The probability to call contact i at any given time may be given as follows in Equation (3):

$$1-e^{-X_i/\beta_i} \qquad (3)$$

where:
　i is a contact;
　X is the time since the last call to the contact i; and
　$\beta_i$ is a mean time between calls parameter for the contact i.

Figure 2:
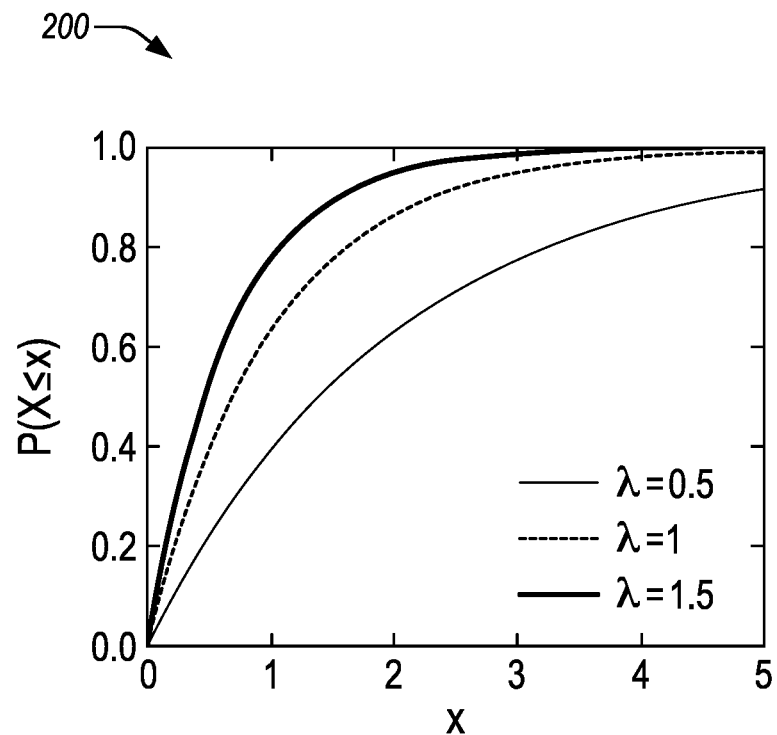
FIG. 2 illustrates an example of a graph of a cumulative distribution function of probability of occurrence of a call to a contact.

FIG. 2 illustrates an example 200 of a graph of a cumulative distribution function of probability of occurrence of a call to a contact. As shown, the X-axis represents time since the last call event to the contact 112, while the Y-axis represents the sum total probability of occurrence of a next call to the contact 112 over time.

Figure 3:
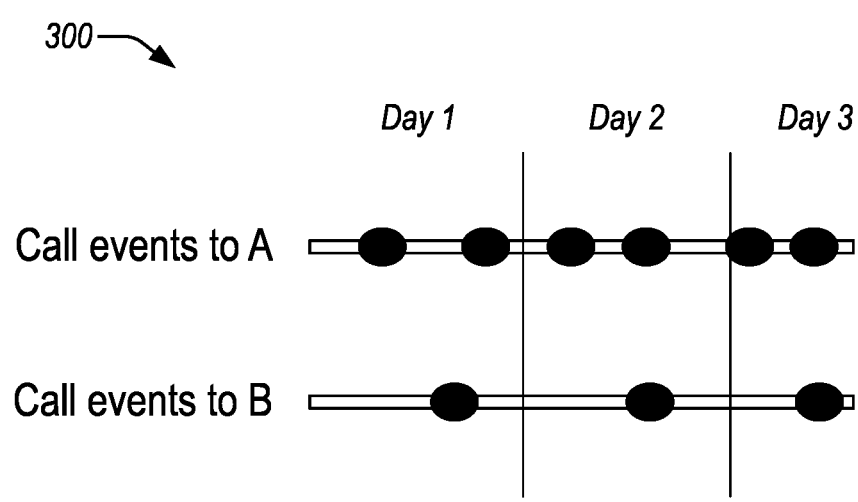
FIG. 3 illustrates an example of call events to a set of contacts.

FIG. 3 illustrates an example 300 of call events to a set of contacts 112. As shown, contact 112 "A" is called on the order of twice a day (e.g., $\lambda_A=2 \leftarrow\rightarrow \beta_A=½$ Day), while contact 112 "B" is called on the order of once a day (e.g., $\lambda_B=1 \leftarrow\rightarrow \beta_B=1$ Day).

In a first scenario, let time be one day since either A or B has been called. At the time, $X_A=X_B=1$, according to Equation (3) the probability of calling A is $1-e-2*1=0.8647$, while the probability of calling B is $1-e-1*1=0.6321$. If the user continues to call neither A nor B, both $X_A$ and $X_B$ will slowly creep up, as will the probabilities. In a second scenario, let time be one day but a call to A was just completed. Accordingly, given that a call to A was just made, $X_A \sim =0$, $\rightarrow$ meaning that the probability of calling A$\rightarrow \sim =0$. As no call was made to B, the probability of calling B continues to increase. In general, to determine the next $X_i$ for a contact 112, call data 114 related to last calls may be buffered, or a filtered version of $X_i$ may be learned.

Other recursive inferences apart from time between calls may additionally or alternately be used. Indeed, many other simple inferences such as relative call frequency and call duration may be learned and updated with formulas similar to equation (1). For instance, the following equation may be used for determining inferences for relative frequency of calls:

$$RF_i(t+1)_{new} = \alpha * RF_i(t)_{old} + (1-\alpha) * \text{Flag}_{i,T/F} \quad (4)$$

In equation (4), calls to different contacts 112 are treated as mutually-exclusive events. Thus, the Flag$_{i,T/F}$ represents binary values (e.g., 0 or 1, true or false, etc.). All contact 112 relative frequency (RF) values may accordingly be updated responsive to a new call being placed. In another example, the following equation may be used for determining inferences with respect to call duration:

$$CD_i(t+1)_{new} = \alpha * CD_i(t)_{old} + (1-\alpha) * Cd_i(t) \quad (5)$$

In equation (5), calls to different contacts 112 are treated separately. Accordingly, only one call duration (CD) for one contact 112 may be updated responsive to a new call being placed.

Regarding recursion-based estimates, updated may be performed with the most recent relevant call data. Moreover, purging of old information is built-in as the estimates reflects some knowledge incrementally captured from most recent history (without buffering the history). Notably, purely count-based estimates may have issues with the purging old info unless a large buffer is in place.

Additional factors may be considered beyond call frequency or mean time between calls when determining likelihood of a next call. In an example, contextual data 122 may be additionally considered for the calls, such as whether the calls were made in or out of the vehicle context (e.g., was a vehicle paired to the phone), location of the call, route taken by a vehicle during the call, traffic along the route during the call, etc. There are various mechanisms for bringing additional contexts into the equation. In an example, certain information may be included directly. In another example, information may be included indirectly (e.g., through an encoding of the information to a simplified representation).

Figure 4:
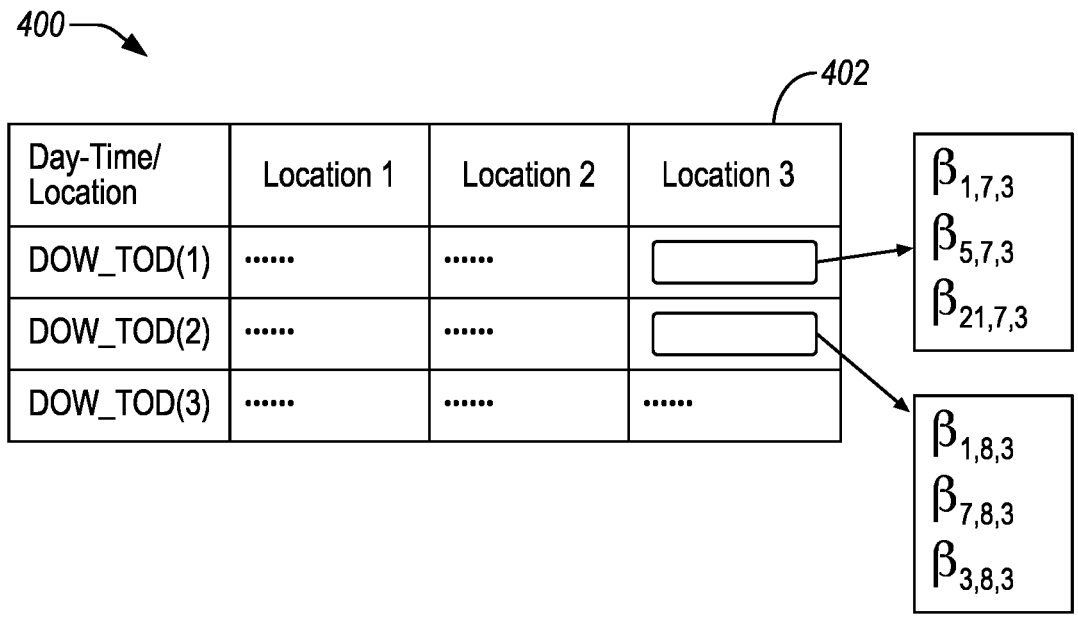
FIG. 4 illustrates an example of a context-encoded model for use in identifying a predicted call list.

FIG. 4 illustrates an example 400 of a context-encoded model 402 for use in identifying a predicted call list 124. As shown in the example 400, the context-encoded model 402 includes time-of-day and location as additional contextual data 122. For instance, each cell of the model 402 may be defined as shown in Equation (6):

$$\beta(i, \text{DOW-TOD}, \text{Location}) \quad (6)$$

where
i indicates a contact;
DOW-TOD indicates a Day of Week/Time of Day partition; and
Location indicates a call location.

In some examples, the call location may be a location of the vehicle when the call enters a vehicle for calls that are started before entry into the vehicle context. Additionally, one or an aggregated (weight averaged) β may be used to address uncertainty during the prediction phase. Some example ways of information aggregation include using information associated with closeness in terms of contexts (i.e., DOW-TOD and location) or historical values of utilizations.

Another potential contextual element to include may be the learning of user acceptance. To do so, an additional parameter may be established at the inference level and/or at the encoded information level of the model 402. The learning mechanism may be similar to that of equations (1), (4), or (5), where acceptance is defined as using the suggested contact 112 within a predefined time period and rejection is defined as not using the suggested contact 112 within the predefined time period. The use of the contact 112 may be controlled from individual inferences. Additionally, whether or not to prompt the user for display of the predicted call list 124 may also be controlled according to the current context.

Figure 5:
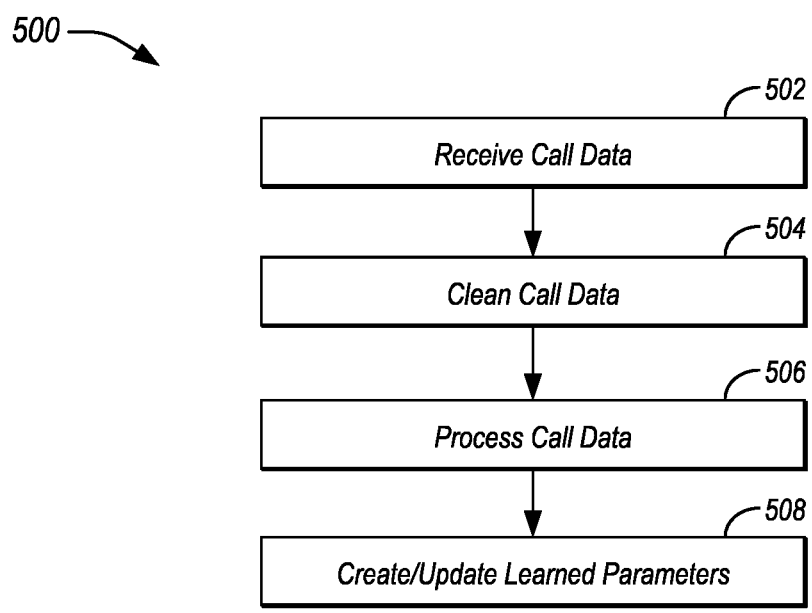
FIG. 5 illustrates an example of a process for learning values for the context-encoded model.

FIG. 5 illustrates an example of a process 500 for learning values for the context-encoded model 402. In an example the process 500 may be performed by the call prediction application 116 executed by the processor 102 according to the call data 114.

At operation 502, the processor 102 receives call data 114. The call data 114 may include information such as contact 112 information, call initialization day/time, call duration, and whether the call was incoming or outgoing. The call data 114 may further include contextual data 122 such as key-on day/time, location information, MAC address or other identifier of the network device 120, pairing status of the network device 120 to a vehicle or other device, key fob information for a vehicle if the call took place in a vehicle, vehicle signals if the call took place in a vehicle (e.g., vehicle gear, speed, door status, seatbelt status, etc.), road class or road type, and so on.

The processor 102 cleans the call data 114 at 504. In an example, the processor 102 may filter the calls in the call data 114 according to duration, whether the call successfully connected the parties, whether the call was incoming or outgoing, or other relevant criteria. For instance, only successfully-completed calls may be used, and call attempts may be filtered out. Or, calls of below a minimum duration may be excluded. It should be noted that these are merely examples, and various call data 114 cleansing techniques may be used.

At 506, the processor 102 processes the call data 114 into a context-encoded model 402. In an example, the processor 102 creates a new identifier for a contact 112 specified by a call in the call data 114 if the contact 112 is not already referenced in a database of recent calls. The processor 102 may further match the DOW/TOD to an existing DOW/TOD cluster/grid of the context-encoded model 402, or may create a new cluster/grid if one does not yet exist. The processor 102 may also match the location of the call to existing location cluster/grid and may create a new cluster if needed. The processor 102 may also optionally consolidate records of multiple calls to the same contact 112 into a single cluster. Accordingly, the processor 102 updates the received and filtered call data 114 into the context-encoded model 402.

At operation 508, the processor 102 creates or updates learned parameters for the context-encoded model 402. In an example, the processor 102 may utilize the information of the context-encoded model 402 to predict next times to call each contact 112 in the context-encoded model 402, such as using the equation (4) and techniques described above. The processor 102 may also buffer the last made call to contact 112 i. After operation 508, the process 500 ends.

Figure 6:
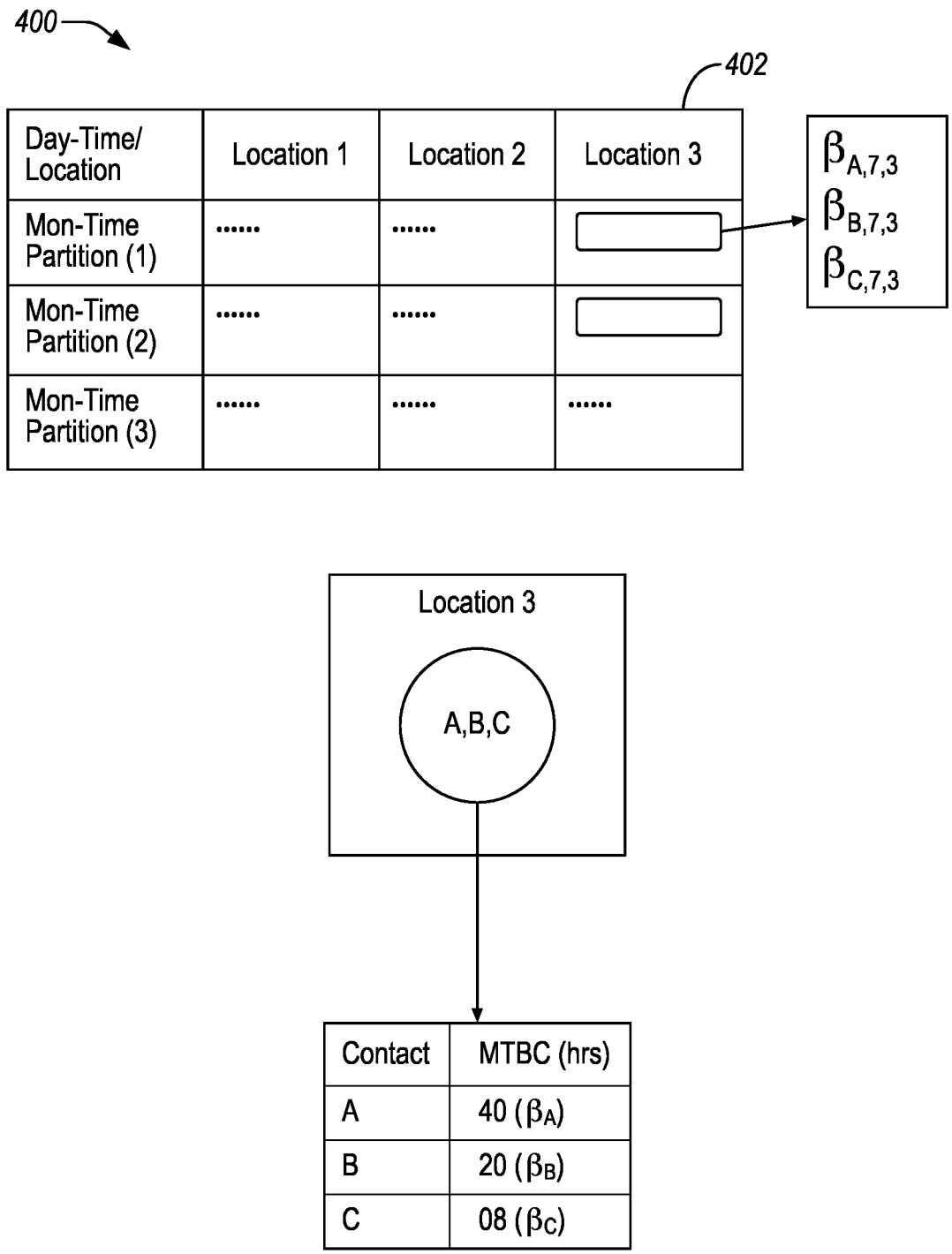
FIG. 6 illustrates a further example of a context-encoded model for use in identifying a predicted call list.

FIG. 6 illustrates a further example 600 of a context-encoded model 402 for use in identifying a predicted call list 124. As shown, the model 402 includes example data for three different contacts 112 at location 3 and for time partition (1). These contacts (A, B, and C) may have mean time between call measurements computed as shown. For instance, for contact A the MTBC is 40 hours, for contact B the MTBC is 20 hours, and for contact C the MTBC is 8 hours.

It should be noted that various values may be chosen for the duration of the time partition. As some possibilities, the duration may be set from a minimum of fifteen minutes to a maximum of one hour or four hours as another example.

As another parameter that may vary, a radius of a cluster location may be defined as a number of miles, such as from a minimum of ¼ mile to a maximum of one mile or perhaps five miles. Or, distance covered by the call participant may be a factor. Using a call duration of four minutes, at 45 miles per hour the distance covered during the call may be three miles, while at 70 miles per hour the distance covered during the call may be 4.66 miles.

Over time rarely used context-encoded models 402 (or portions of the model 402) may be deleted. For instance, a contact 112 that is no longer called for a predefined time period may be removed entirely from the model 402. Removal criteria may include, as some possibilities, mean time between calls exceeding a predefined value, long call duration since the last call, or singular records with no second call. User verification may be used to aid in the pruning of the models 402. As another possibility, similar models 402 may be consolidated, e.g., for contacts 112 that are called with similar frequency and context to one another.

Figure 7:
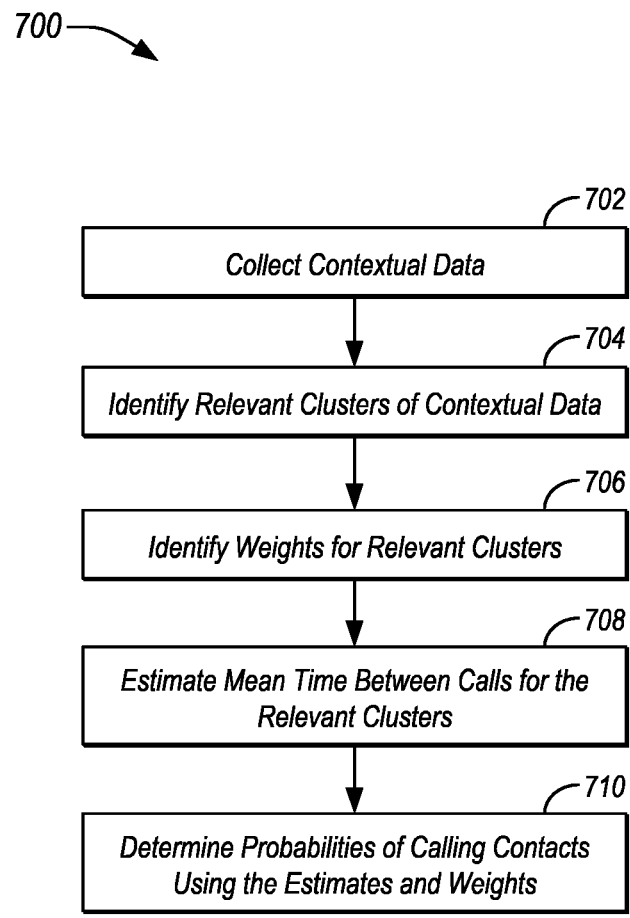
FIG. 7 illustrates an example process for prediction of calling of contacts to generate the predicted call list.

FIG. 7 illustrates an example process 700 for prediction of calling of contacts 112 to generate the predicted call list 124. In an example, the process 700 may be performed by the call prediction application 116 executed by the processor 102 according to the context-encoded model 402.

At operation 702, the processor 102 collects contextual data 122. In an example, the processor 102 may determine the current DOW/TOD (e.g., using a clock or other source of time information). In another example, the processor 102 may determine the current location of the processor 102 (e.g., using GNSS or another source of location information).

At 704, the processor 102 identifies relevant clusters of the model 402 according to the collected contextual data 122. In an example, the processor 102 uses the current DOW/TOD to determine the closest DOW/TOD cluster(s). In another example, the processor 102 uses the current location information to determine the closest location cluster(s).

The processor 102 identifies weights for the relevant clusters of the model 402 at 706. In an example, the processor 102 may utilize a determined closeness of current day/time to determine weighing factors for relevant day/time clusters, which may be referred to as $W_{dow/tod}$, and may use closeness of current location to determine weighing factors for relevant location clusters, which may be referred to as $W_{location}$.

Figure 8:
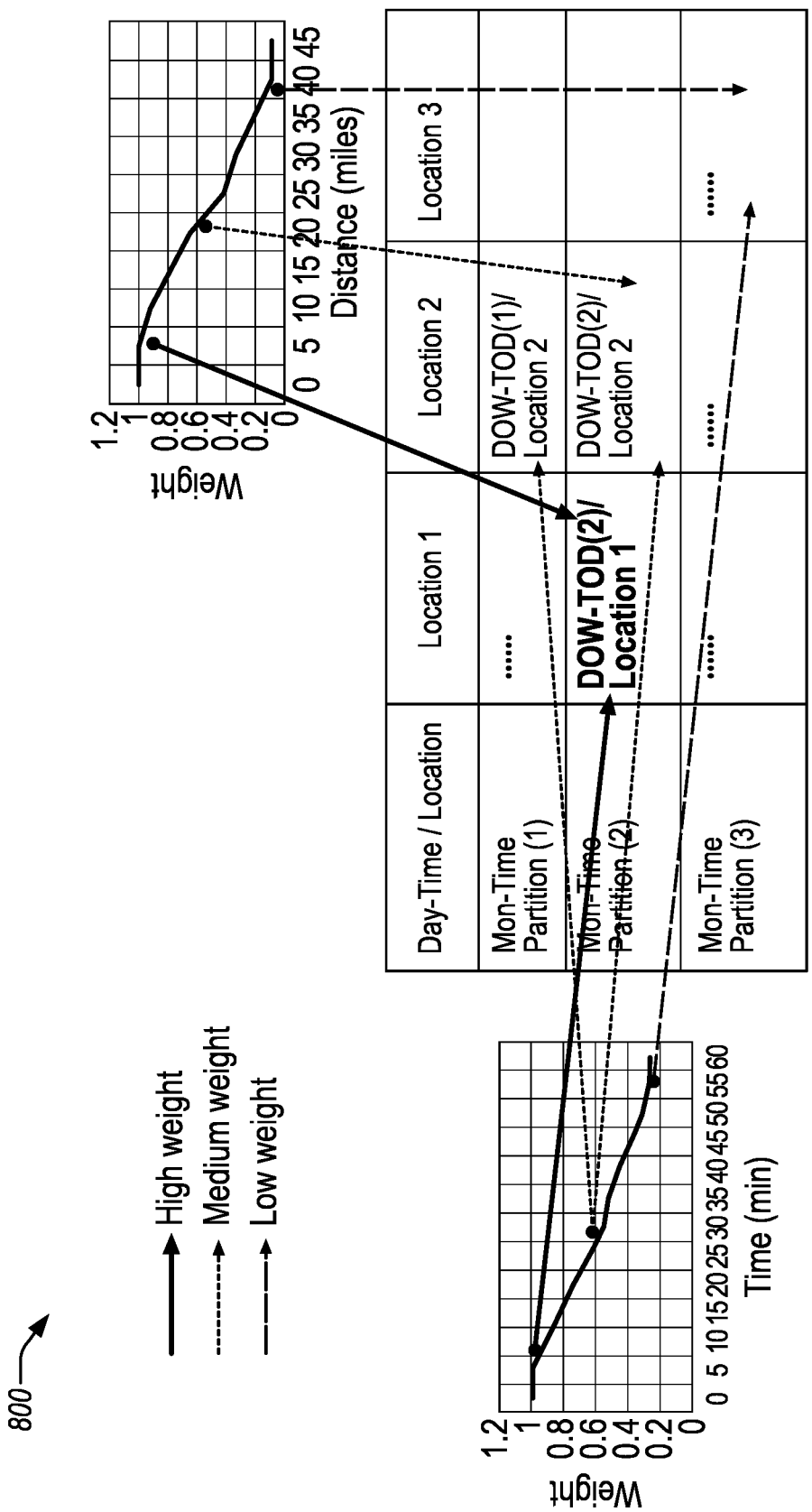
FIG. 8 illustrates an example determination of closeness and weights.

FIG. 8 illustrates an example 800 determination of closeness and weights. As shown, times closer to the day and time of the element of the clusters of the model 402 are given a higher weight than those further away from the day and time of the element. Similarly, locations closer to the day and time of the element of the clusters of the model 402 are given a higher weight than those farther from the location of the element.

Referring back to FIG. 7, at operation 708 the processor 102 estimates mean time between calls for the relevant clusters. In an example, the processor 102 determines, for each of the clusters, a $\beta$ for the given cluster day/time and location parameters. The processor 102 may also determine, for each of the contacts 112, a $\beta_i$ as a weighted average of the $\beta$ for each relevant cluster to the contact using the weights identified at operation 706.

At 710, the processor 102 determines probabilities of next calling each of the contacts 112. In an example, the processor 102 calculates $X_i = T_{current} - T_i$ and converts the result into an appropriate unit (e.g., hours). The processor 102 also calculates $P_i$ for each relevant contact 112, e.g., according to equation (3). This information may be used to generate the predicted call list 124 as a listing of the contacts 112 in decreasing order of probability. For instance, the maximum $P_i$ may be identified as the most likely next contact 112 to call. After operation 710, the process 700 ends.

Thus, the user's calling behavior may be learned and used to predict and rank the next contacts 112 to be called based on the current context. Additional contextual data 122, such as day, time, and location, may also be used, such that the current context of the user can act as a predictor of which contacts 112 are more likely to be called.

Figure 9:
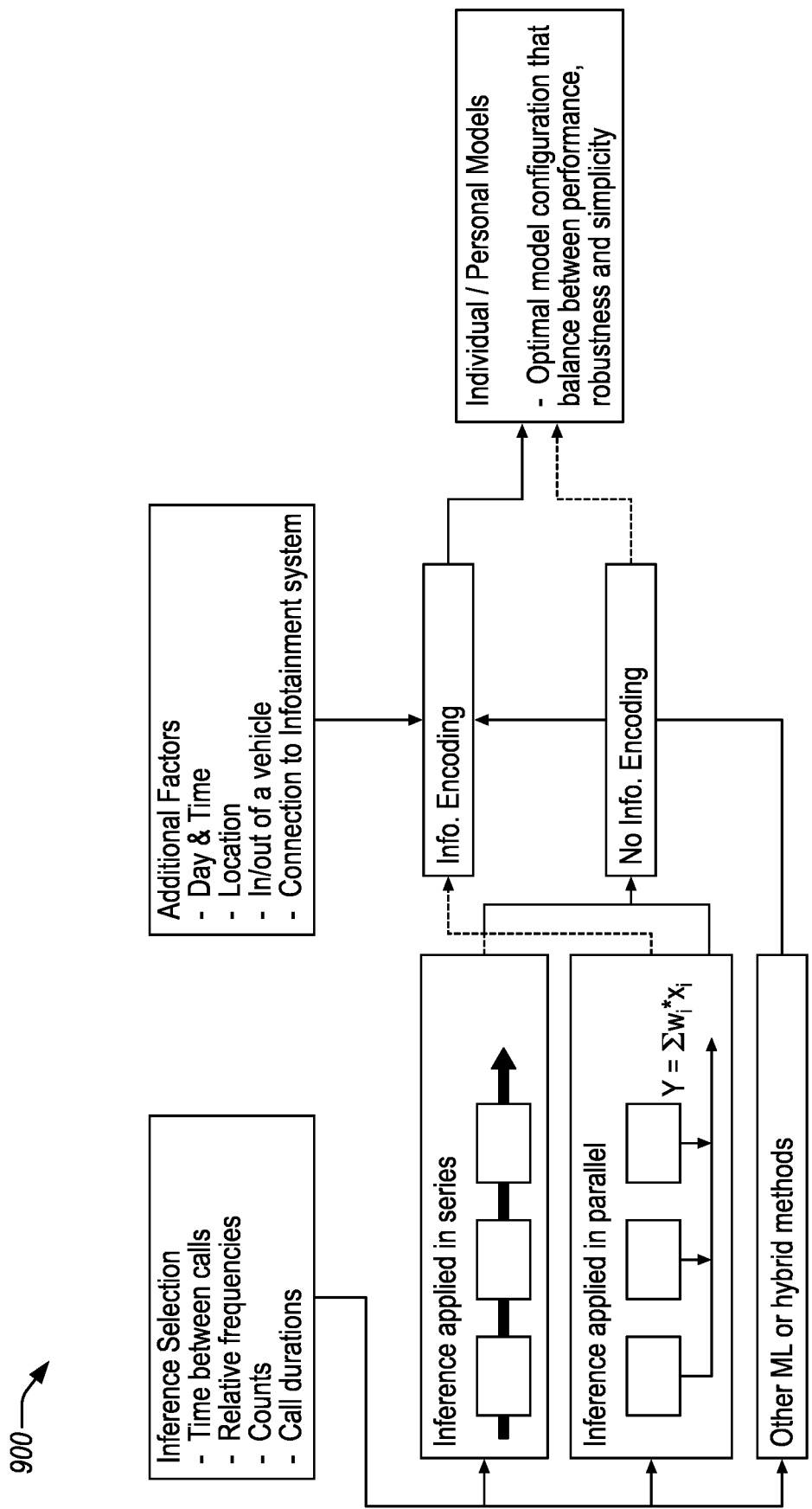
FIG. 9 illustrates an example of inference and feature selection and model structure optimization.

FIG. 9 illustrates an example 900 of inference and feature selection and model structure optimization. As shown, many variations on the described systems and methods may be used. For instance, with respect to the various inferences for calling behaviors, these inferences may be applied in series or in parallel when performing the estimation. Additionally, other machine learning or hybrid methods may additionally be used with respect to the estimation phase.

Regarding the context-encoded model 402, additional contextual data 122 may be utilized in the determination of the next contacts 112 to be called. For instance, additional information may be encoded into the context-encoded model 402. This may include, as some non-limiting examples, day and time, start location of the call, end location of the call, route identifier of a route being traversed by a vehicle including the caller, whether the call was made inside or outside a vehicle, whether the calling device is connected to the vehicle, and a secondary time of how far in time from initiation of a route in the vehicle the call was initiated. In the alterative, no information encoding may also be used as a possibility.

With the many available variations, individual or personalized models may be created that provide for an optimal model configuration that balances performance, robustness, and simplicity in design of the model. Regarding incremental model refinement, statistical parameters may be updated through recursions, and individual inferences' performance may be tracked over time as well as tracking of performance between overall vs situational variants. According to these individual inferences or using parallel inference aggregations, adjustments to weights of influence between different inferences may be performed, as well as adjustments to weights of influence of overall vs. situational models. Batch evaluation-based refinement may also be performed, such as storage of a hashed golden dataset, creation of additional inferences based on additional inputs or newly acquired knowledge, or different configurations of serial-type aggregations of the multiple inferences.

Figure 10:
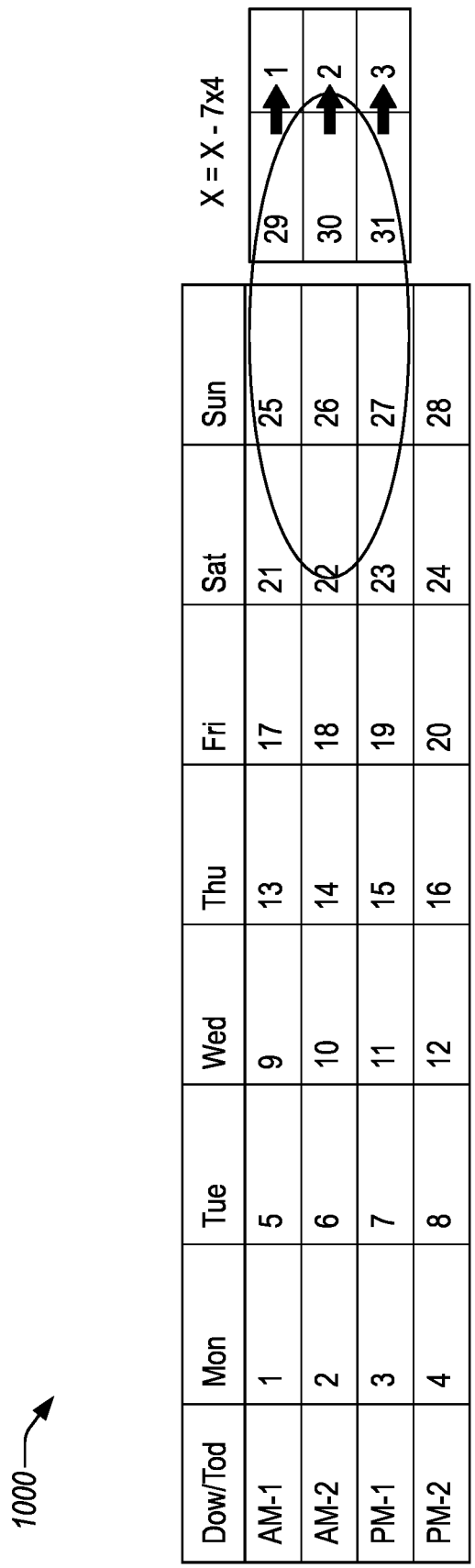
FIG. 10 illustrates an example of accounting for circular relationships among partitions of the context-encoded model.

FIG. 10 illustrates an example of accounting for circular relationships among partitions of the context-encoded model 402. For instance, the repeating pattern of times of day and days of the week as shown may be examples of such circular relationships. The context-encoded model 402 may be improved to address these and other examples of partitions having circular relationships. For instance, the circular relationship may be represented on the model side as an angle or degree of revolution, such that values and the beginning and end of a revolution through the circular pattern are considered by the model to be adjacent. For each day of the week, identification of neighbors is trivial if such a circular relationship exists. Such a relationship may be utilized for aiding in the prediction phase, during which information from neighboring partitions may help generate commonsense patterns.

Figure 11:
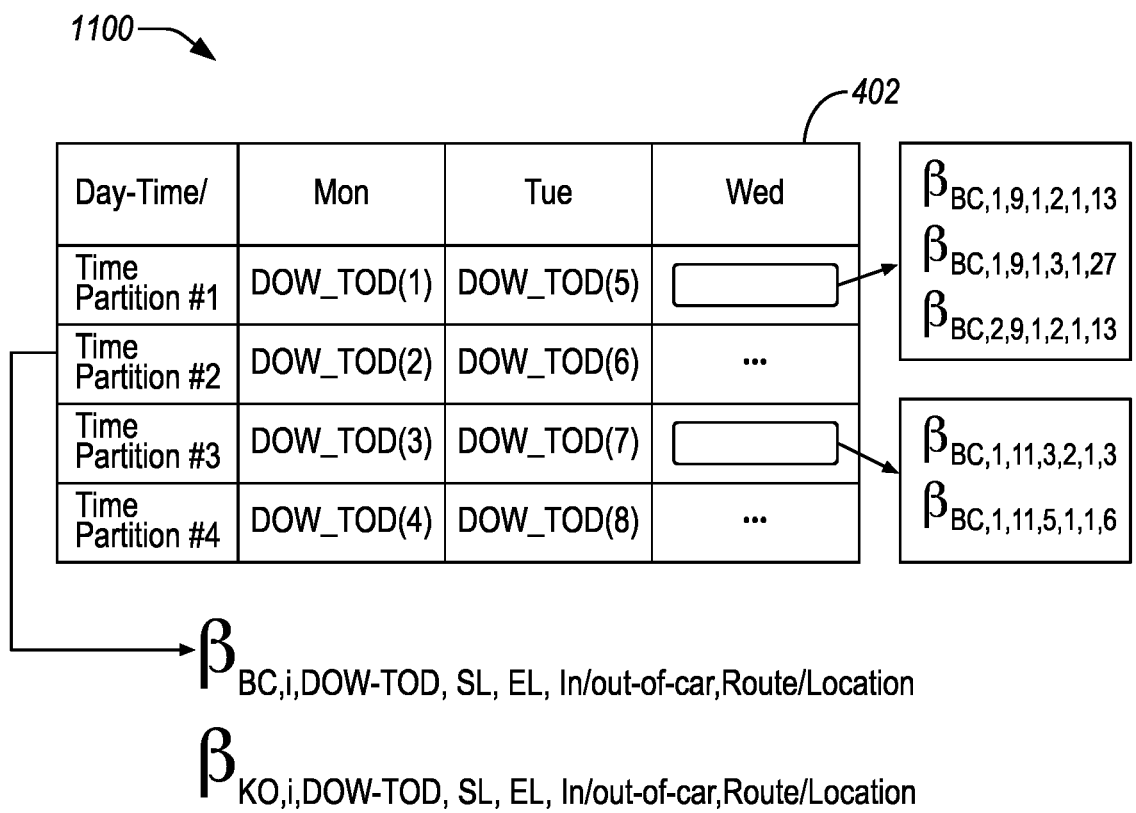
FIG. 11 illustrates an alternate example of a context-encoded model including additional contextual data.

FIG. 11 illustrates an alternate example 1100 of a context-encoded model 402 including additional contextual data 122. As shown, the alternate example context-encoded model 402 further includes start location (SL), end location (EL), whether the call was from the vehicle or not, and a route/location for the call. Moreover, an additional calculation is also provided with respect to time/distance since key-on. This secondary component may allow for distinguishing between situations where a user calls soon after entering a vehicle as compared to calling during a route. The ultimate β may be computed as an aggregated or weight-averaged β of these results.

With respect to the additional information, the process 500 for learning values for the context-encoded model 402 may be adjusted. For instance, the learned parameters may be created or updated using the following equations in place of equation (4):

$$\beta_{BC, i, DOW\text{-}TOD, SL, EL, In/out\text{-}of\text{-}car, Route/Location}$$

$$\beta_{KO, i, DOW\text{-}TOD, SL, EL, In/out\text{-}of\text{-}car, Route/Location} \tag{7}$$

Additionally, the process 700 for predicting the next contacts 112 may also be adjusted. For instance, at operation 702 the processor 102 may additionally determine a further time input as $T_{current}$=Current time+$\Delta t$, where the $\Delta t$ is an amount of time from starting of the vehicle (or the user entering the vehicle in another example). Additionally, at operation 708, the processor 102 may estimate $\beta_{BC}$ and also $\beta_{KO}$ for each relevant contact 112. At operation 710, the processor 102 may calculate $P_{BC,i}$ and $P_{KO,i}$ for each relevant contact 112, e.g., according to equations (5), where $P_{BC,i}$ and $P_{KO,i}$ may be scaled by a max of $W_{dow/tod}$ and $W_{location}$. The maximum of $P_{BC,i}$ fusing $P_{KO,i}$ as a tiebreaker may then be used to identify the likely next contact 112 to call.

Even further enhancements may also be performed to the described systems and methods. For instance, with respect to pattern extraction, additional aspects may be considered such as time between calls (overall vs. conditional); relative frequencies of calls (overall vs. conditional); other attributes such as call duration (overall vs. conditional); work vs off-work patterns; and in-vehicle vs generic, normal, or out-of-vehicle patterns.

Events and reminders may also be considered in the determination of suggested contacts 112 to call. For instance, recurrent events of significance related to calling may be included, such as reminding the user to call the mom contact 112 on Mother's Day, or to remind the user of call backs (e.g., extracted from voice mail message content, such as a statement in a voicemail requesting the user to call the person back when off work or during a given time).

Vehicle system state inference and vehicle health information may also be considered. For instance, a sudden system fault such as a flat tire may override other call recommendations to instead cause the system to provide a contact 112 for a nearest shop, dealership, or road/emergency assistant. As another example, a recall notice or significant diagnostic trouble codes (DTC) may cause an override for the system to recommend a contact 112 for a local dealership.

Still other enhancements are possible. For instance, the system may utilize a prediction mechanism to adaptively adjust weights for the various inferences from different patterns observed in the call data 114. Or, the system may elect to filtering out contact 112 numbers if they are within proximity of one another (e.g., to avoid overcounting multiple attempts to reach a single individual).

It should also be noted that the described systems and method may include data and processors stored in the cloud, where the call data 114 and determination of the next contacts 112 may be synchronized between processing devices determining the next contacts 112 and calling devices that call the likely next contacts 112.

While in many examples, the system refers to calls, it should be noted that the described systems and methods may be applicable to other forms of communication as well, such as text messages, messages on social media, and so on. In one example, the algorithm may determine use phone and text transmissions from the same number interchangeably. The system may additionally, in the case of prediction of a context to text, may offer to send a text message to a contact 112 indicated as being the most likely contact 112 to text. For instance, a user interface may provide options to transmit a text to the likely contact 112.

It should also be noted that in some cases a contact 112 may have multiple different phone numbers or other identifiers. For instance, a contact 112 may have a home phone, office phone, mobile phone, and multiple messaging applications. In such an example, the algorithm may treat these addresses as being the same contact 112. Or as another possibility, the algorithm may process a vector of these addresses for a particular contact 112 to determine an appropriate address to use to reach the content 112, e.g., based on day, time, or other context. For instance, a weight may be calculated and applied to the vector as a function of communication activity of an element in the vector.

As another possibility, a prediction algorithm may use the contact information of the active radio station to generate a predicted probability of a desired contact number. For instance, the prediction algorithm may use a plurality of elements of contextual information, such as a radio station being listened to in the vehicle, state information of the vehicle, current time, current location, selected contacts. Additionally, content of text messages may be used to predict a probability of desired text to populate a proposed text message to a probable contact 112 to message next.

Figure 12:
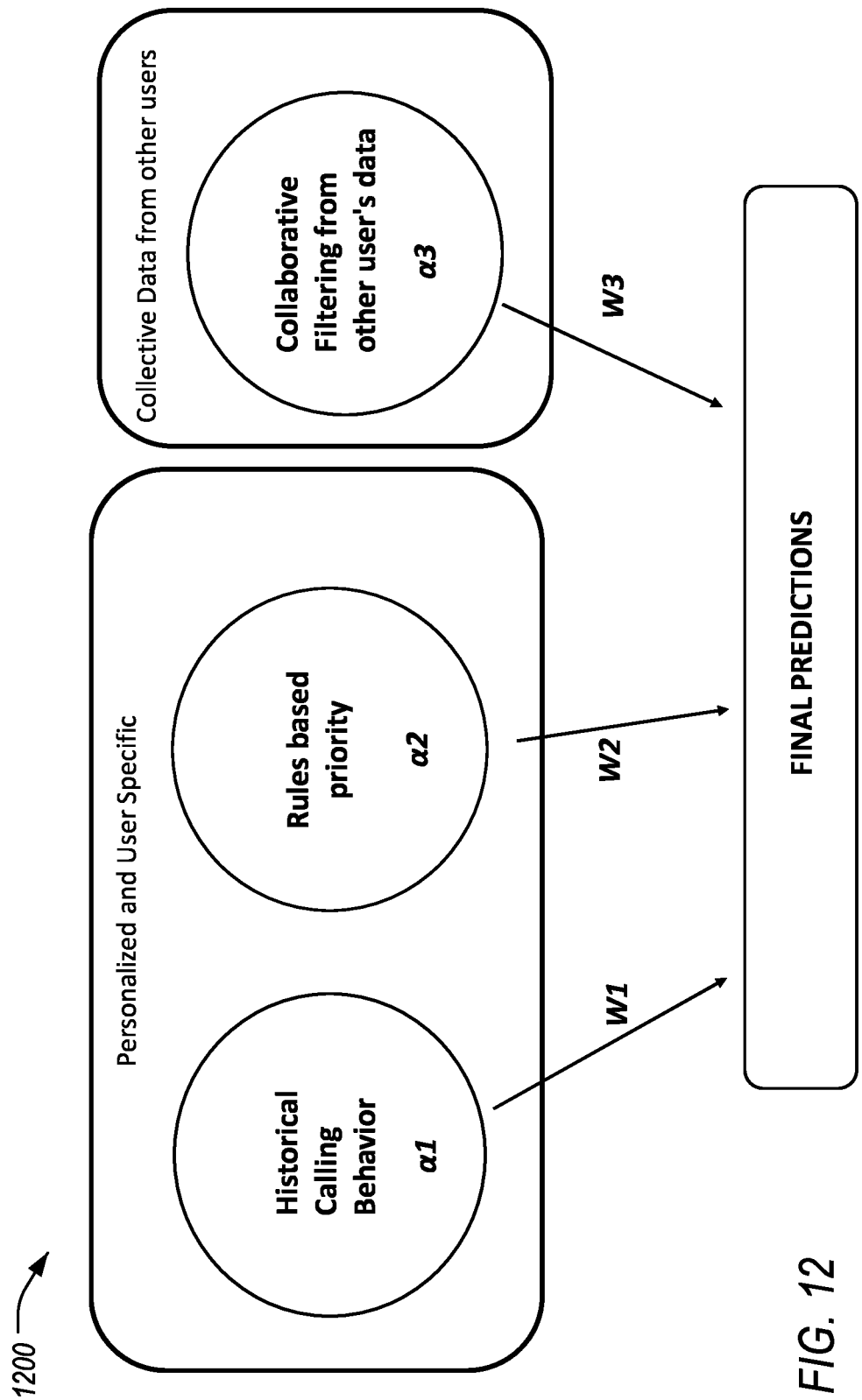
FIG. 12 illustrates an example process for the addition of rule-based priority and collaborative filtering to the prediction algorithm.

FIG. 12 illustrates an example process 1200 for the addition of rule-based priority and collaborative filtering to the prediction algorithm. As discussed above, historical calling behavior may be learned with a learning rate $\alpha_1$, e.g., with respect to Equation (1) resulting in a first set of weights $W_1$ for each of the contacts 112. This behavior may be personalized and user-specific, as it is customized according to the behavior of the particular user. Additionally, rule-based priority may be learned with a learning rate $\alpha_2$, resulting in a second set of weights $W_2$ for each of the contacts 112. These rules may also be personalized and user-specific, as it is customized according to the behavior of the particular user. Additionally, collaborative filtering may be learned with a learning rate $\alpha_3$, resulting in a third set of weights $W_3$ for each of the contacts 112. As compared to the historical calling behavior and rule-based priority weights, the collaborative filtering may be performed using data from other users of the system. The weights $W_1$, $W_2$, and $W_3$ may be combined to determine final predictions for predicted probability of a desired contact number for each of the contacts 112. It should be noted that performance of the system may be adjustable according to changes to the learning rates $\alpha_1$, $\alpha_2$, and $\alpha_3$ and the weights $W_1$, $W_2$, and $W_3$ depending on user's acceptance of recommended numbers.

Referring first to the historical calling behavior, as noted above this measure may be user-specific. From the user's historical call logs the system may learn aspects such as call frequency, call duration, time since last call, and/or mean time between calls. This may result in predicted probabilities of calling each contact 112. Additional contexts may be encoded within the data to be analyzed, such as day, time, location, calls made in/out of vehicle, and other vehicle context (e.g., speed, etc.).

With respect to rule-based priority, rules may be defined to provide priority adjustments to the probabilities determined according to the historical calling behavior. These rules may include rules for occasions, rules to include contacts 112 and/or contact numbers, and rules to exclude contacts 112 and/or contact number.

The rules for occasions may be set by the user. These rules may identify significant dates and days of the week where user can prioritize a contact 112. In an example, a user may wish to prioritize calling his or her mother on Mother's Day (which is same day of the week each year), her birthday (which is the same date each year), and holidays (which be specified with respect to external lookup of holiday dates, by date, or by day of the week of the year). Using the rules, the prioritization algorithm may be customized to give higher weight to user choices and reset/reduce weight of other rules.

The rules to include contacts 112 and/or contact numbers may use machine learning techniques to identify and extract portions of text messages, emails, and or voicemail messages, which can be used to generate rules to prioritize numbers. In an example, speech recognition may be performed to voicemail to recognize the voicemail into text. The resultant recognized text or text message may then be used to construct a corpus to be mined to identify key information. This key information may include, for instance, the recorded caller asking to be called under certain conditions such as a time window or at a location. For example, the voicemail may indicate, as some examples, for the recipient user to "call me before 10 pm", "call me when you get home," "call me before you leave work." In such examples, the phrase "call me" or an equivalent may serve as an indication that an external factor for calling the user is specified in the voicemail or text (e.g., the time to call, the location to call from, etc.).

Application of the rules may further involve combination with real time vehicle data and/or signaling information to determine the external factor for evaluation of the rules. This data may include, as some non-limiting examples, current GNSS or other location of the vehicle, predicted/learned destinations of the vehicle, time of day, etc.). When the conditions of the respective rules are met, the contact(s) 112 identified in the text/voicemail may be prioritized.

The rules to exclude contacts 112 and/or contact numbers may operate similarly. For instance, the exclusionary rules may exclude contacts 112 present in proximity to the user, as such contacts 112 are directly available. In one example, the phone or other mobile device of a contact 112 may be detected in proximity to the vehicle and/or mobile device of the user whose contacts 112 are being prioritized. In another example the biometric sensors of the vehicle (e.g., seat weight sensors, cameras, fingerprint sensors, voiceprint sensors, etc.) may detect presence of one or more of the user's contacts 112 as being in-vehicle. In yet another example, the rules may include an exclusionary rule to block calls identified as being from spam contacts 112.

The system may also learn from other users' calling patterns and contexts to perform collaborate filtering. To do so, information from all or a subset of the users of the system may be anonymized (e.g., with respect to name, phone number etc.) and applied as a data set for data mining.

Based on the data set, the system may identify contacts 112 (or contact 112 relationships such as spouse, repair shop, etc.) that are called in the context of occurrence of one or more other criteria. These criteria may include, for example, vehicle type, vehicle health, whether the vehicle is disabled (i.e., disabled status), what phone numbers other users usually call in that location (e.g., a location determined using a clustering algorithm to aggregate locations), and/or a geographic area with further context (e.g., a vehicle issue such as a flat tire).

As one example of a prioritization for a vehicle issue, if a vehicle has a recall then the contact 112 for the closest dealer, the contact 112 the dealer at which the vehicle was purchased or leased, and/or the contact 112 closest dealer to a home location for the vehicle may be prioritized. As another example of a prioritization for a vehicle issue, a vehicle-disabling condition (such as low coolant, high engine temperature, a flat tire, etc.) may cause the system to prioritize a contact 112 for roadside assistance and/or one or more user set contacts for conditions in which an issue occurs.

As yet another example of a prioritization for a vehicle issue, non-disabling conditions may also cause a prioritization of one or more contacts 112. For instance, if the vehicle detects a condition and/or logs a DTC that does not disable the vehicle, but causes potential issues for a vehicle function (such as radar issue disabling active cruise control, a change engine oil soon trigger, etc.), the contact 112 for the closest dealer, the contact 112 the dealer at which the vehicle was purchased or leased, and/or the contact 112 closest dealer to a home location for the vehicle may be prioritized.

It should be noted that, in some examples, these criticized dealer contacts 112 may not be contacts that are saved to the user's address book. Instead the contacts 112 may be queried by the vehicle, e.g., by searching for local dealers or by querying a network vehicle service for providing contacts 112 for vehicle service. Dealers may, in turn, subscribe to the service to receive leads from vehicles in need of service. It should also be noted that these prioritizations may also include an indication of the issue that occurred (e.g., deflating tire) to let the user know of the reason for the recommended contact(s) 112.

Variations on the addition of rule-based priority and collaborative filtering to the prediction algorithm may be provided. For instance, some users may utilize their mobile device with a vehicle for a mix of business and personal use. For example, plumbers, real estate agents, shuttle services, delivery services, are examples of professionals who may use a vehicle for both work and non-work. A plumber or shuttle service may wish to call their next customer when entering the vehicle. In such a case, a navigation destination could be matched to a contact 112 corresponding to the next customer and the learning function could be suspended. When the plumber is not traveling for business, the prediction algorithm may revert back to normal operation.

In another example variation, the model weights $W_1$, $W_2$, and $W_3$ may be varied based on various factors. For instance, the model weights $W_1$, $W_2$, and $W_3$ may be varied depending on time of the day and/or day of the week. In another instance, the model weights $W_1$, $W_2$, and $W_3$ may be varied according to user selection (e.g., 'work mode' disabling learning and referring to a calendar or other schedule, 'personal mode' enabling learning and recommending, etc.) to adjust the importance given to different predictions/recommendations.

Additionally, feedback from the user or user engagement with the suggested contacts 112 may be considered as a measure to improve/tweak the performance of the models (e.g., adjust the learning rates $\alpha_1$, $\alpha_2$, and $\alpha_3$, adjust the weights $W_1$, $W_2$, and $W_3$, adjust rule priorities, etc.)

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A call prediction device comprising:
   a memory configured to store call records of phone calls to a plurality of contacts; and
   a processor programmed to
      determine a first set of weights indicative of first probabilities of calling each of the plurality of contacts, according to current contextual information for a caller and call inferences determined from clusters of a context-encoded model created from the call records, each cluster corresponding to a unique combination of ranges of values of the contextual information;
      determine a second set of weights indicative of second probabilities of calling each of the plurality of contacts according to a set of rules defining prioritizations for contacts based on external factors;
      determine a third set of weights indicative of third probabilities of calling each of the plurality of contacts according to calling patterns of other of the plurality of contacts;
      combine the first, second, and third sets of weights to determine final predictions for predicted probabilities to call each of the contacts; and
      identify the most likely next contact to call as the one of the plurality of contacts having a highest of the predicted probabilities.

2. The call prediction device of claim 1, wherein:
   the first set of weights indicative of the first probabilities is learned with a first learning rate;
   the set of rules defining prioritizations for contacts is learned with a second learning rate; and
   the calling patterns of other of the plurality of contacts is learned with a third learning rate; and
   the first, second, and third learning rates are adjusted according to user acceptance of the contacts that are recommended.

3. The call prediction device of claim 1, wherein the external factors include occurrence of a holiday, occurrence of a day of the week, occurrence of a day of the year, and the set of rules prioritize a predefined contact according to occurrence of the external factors.

4. The call prediction device of claim 1, wherein the external factors include detection of predefined phrases in voice messages and/or text messages, and the set of rules prioritize a predefined contact according to occurrence of the predefined phrases.

5. The call prediction device of claim 1, wherein the external factors include detection of one or more predefined vehicle issues, and the set of rules prioritize a predefined contact according to occurrence of the predefined vehicle issues.

6. The call prediction device of claim 1, wherein the processor is further programmed to:
   perform speech recognition on voicemail messages to recognize the voicemail messages into text;
   construct a dataset including one or more voicemail texts, text messages, or email messages to create a corpus;
   identify, in the corpus, one or more phrases serving as an indication that an external factor for calling one of the contacts is specified; and
   create a prioritization to add to the set of rules indicating the specified contact and the external factor.

7. The call prediction device of claim 1, wherein the processor is further programmed to:
   identify proximity of one of the plurality of contacts to a vehicle including a second of the contacts; and
   perform a prioritization to remove the one of the contacts from consideration as one of the plurality of contacts having a highest of the predicted probabilities due to the proximity.

8. The call prediction device of claim 1, wherein the processor is further programmed to anonymize the calling patterns of the other of the plurality of contacts with respect to name and phone number.

9. The call prediction device of claim 1, wherein the external factors include occurrence of a vehicle issue for a vehicle, and the set of rules includes a prioritization of a contact corresponding to the vehicle issue, the contact being one or more of a closest dealer to the vehicle, a dealer at which the vehicle was purchased or leased, or a closest dealer to a home location of the vehicle.

10. The call prediction device of claim 1, wherein the external factors include occurrence of a vehicle issue for a vehicle, and the set of rules includes a prioritization of a contact corresponding to the vehicle issue, the contact being an emergency contact pre-listed by the user.

11. The call prediction device of claim 1, further comprising a display, wherein the processor is further programmed to output to the display a call list including one or more contacts identified to be the most likely next call to be made.

12. The call prediction device of claim 11, wherein the processor is further programmed to display the call list in decreasing order of probability of being called, with the contact having the highest of the probabilities being listed first.

13. The call prediction device of claim 11, wherein the processor is further programmed to display an indication of the external factor causing prioritization of a contact on the call list.

14. The call prediction device of claim 11, wherein the processor is further programmed to:
in a first user-selected mode, identify the most likely next contact to call as the one of the plurality of contacts having the highest of the predicted probabilities; and
in a second user-selected mode, identify the most likely next contact to call as the one of the plurality of contacts indicated by a work schedule of the user.

15. A method for call prediction, comprising:
updating parameters of clusters of a context-encoded model, per a frequency estimation of an aspect of calls to contacts with respect to unique combinations of contextual data of calls matching the respective clusters;
weighting the clusters according to relevance of the unique combinations of contextual data to current contextual information;
determining first probabilities of calling individual contacts according to the current contextual information and one or more inferences between calls determined from the clusters as weighted;
determining second probabilities of calling each of the plurality of contacts according to a set of rules defining prioritizations for contacts based on external factors;
determining third probabilities of calling each of the plurality of contacts according to calling patterns of other of the plurality of contacts; and
combining the first, second, and third sets of weights to determine final predictions for predicted probabilities to call each of the contacts.

16. The method of claim 15, further comprising providing an indication of a contact out of the contacts that is most likely to be called next according to the determined probabilities.

17. The method of claim 15, further comprising displaying a list of contacts in decreasing order of determined probability of being called, with the contact having the highest of the probabilities being listed first.

18. The method of claim 15, further comprising utilizing a second probability, determined using a second context-encoded model keyed to time since beginning a route in a vehicle, as a tie-breaker for the probabilities of being a likely next call.

19. The method of claim 15, further comprising:
updating learned parameters of the context-encoded model according to a frequency estimation of how often a respective contact has been called according to stored call records with respect to the unique combination of ranges of values of the contextual information of the respective cluster; and
applying a forgetting factor to the frequency estimation such that calls of the call records made less recently in time are values less than calls of the call records made more recently in time.

20. A non-transitory computer-readable medium comprising instructions that, when executed by a computing device, cause the computing device to:
update parameters of clusters of a context-encoded model, per a frequency estimation of an aspect of calls to contacts with respect to unique combinations of contextual data of calls matching the respective clusters;
weight the clusters according to relevance of the unique combinations of contextual data to current contextual information;
determine first probabilities of calling individual contacts according to the current contextual information and one or more inferences between calls determined from the clusters as weighted;
determine second probabilities of calling each of the plurality of contacts according to a set of rules defining prioritizations for contacts based on external factors;
determine third probabilities of calling each of the plurality of contacts according to calling patterns of other of the plurality of contacts; and
combine the first, second, and third sets of weights to determine final predictions for predicted probabilities to call each of the contacts.

21. The medium of claim 20, further comprising one or more of:
providing an indication of a contact out of the contacts that is most likely to be called next; and
displaying a list of contacts in decreasing order of likelihood, with the contact having the highest of the probabilities being listed first.

22. The medium of claim 20, further comprising utilizing a second probability, determined using a second context-encoded model keyed to time since beginning a route in a vehicle, as a tie-breaker for the probabilities of being a likely next call.

23. The medium of claim 20, further comprising:
updating learned parameters of the context-encoded model according to a frequency estimation of how often a respective contact has been called according to stored call records with respect to the unique combination of ranges of values of the contextual information of the respective cluster; and
applying a forgetting factor to the frequency estimation such that calls of the call records made less recently in time are values less than calls of the call records made more recently in time.

* * * * *